United States Patent
Mallah

(10) Patent No.: US 12,193,462 B2
(45) Date of Patent: Jan. 14, 2025

(54) PASTEURIZATION OF CONVENIENCE MEALS IN HERMETICALLY SEALED CONTAINERS

(71) Applicant: Fricke und Mallah Microwave Technology GmbH, Peine (DE)

(72) Inventor: Marcel Mallah, Peine (DE)

(73) Assignee: Fricke und Mallah Microwave Technology GmbH, Peine (DE)

(*) Notice: Subject to any disclaimer, the term of this patent is extended or adjusted under 35 U.S.C. 154(b) by 1071 days.

(21) Appl. No.: 17/420,353

(22) PCT Filed: Apr. 1, 2019

(86) PCT No.: PCT/DE2019/100297
§ 371 (c)(1),
(2) Date: Jul. 1, 2021

(87) PCT Pub. No.: WO2019/192657
PCT Pub. Date: Oct. 10, 2019

(65) Prior Publication Data
US 2022/0095652 A1   Mar. 31, 2022

(30) Foreign Application Priority Data

Apr. 3, 2018 (DE) .................... 10 2018 107 856.0
Apr. 19, 2018 (DE) .................... 10 2018 109 426.4

(51) Int. Cl.
*A23L 3/01* (2006.01)
*A23L 3/00* (2006.01)
(Continued)

(52) U.S. Cl.
CPC .............. *A23L 3/01* (2013.01); *A23L 3/001* (2013.01); *A23L 3/04* (2013.01); *H05B 6/686* (2013.01); *H05B 6/782* (2013.01); *A23V 2002/00* (2013.01)

(58) Field of Classification Search
CPC ........... H05B 6/686; H05B 6/782; A23L 3/01; A23L 3/001; A23V 2002/00
See application file for complete search history.

(56) References Cited

U.S. PATENT DOCUMENTS 3,494,723 A * 2/1970 Gray .................. A61L 2/12
                                                131/299
3,889,009 A   6/1975 Lipoma
(Continued)

FOREIGN PATENT DOCUMENTS

| EP | 2 400 862 B1 | 12/2012 |
| JP | S-58-216681 A | 12/1983 |
| WO | WO 2004/045985 A1 | 6/2004 |

OTHER PUBLICATIONS

R.A. Stanley et al., "Microwave-Assisted Pasteurization and Sterilization-Commercial Perspective," *The Microwave Processing of Foods*, pp. 200-219, 2017.
(Continued)

*Primary Examiner* — Brian W Jennison
(74) *Attorney, Agent, or Firm* — Blank Rome LLP

(57) ABSTRACT

Apparatus and method for pasteurizing food products and ready meals in hermetically sealed packages (22) by means of microwaves, comprising a microwave chamber (14); a lower conveyor belt (20) for the packages (22); an upper conveyor belt (18), extending substantially horizontally and vertically movable, and a microwave source (16) located below the lower conveyor belt (20), the microwave chamber (14) being under atmospheric ambient pressure. The apparatus comprises a cooling plate (10) in close contact with the upper conveyor belt (18) so that during microwave heating the top of the package (22) is cooled to below the condensation point of water vapor and overpressure in the package is avoided.

10 Claims, 7 Drawing Sheets

Figure 1:
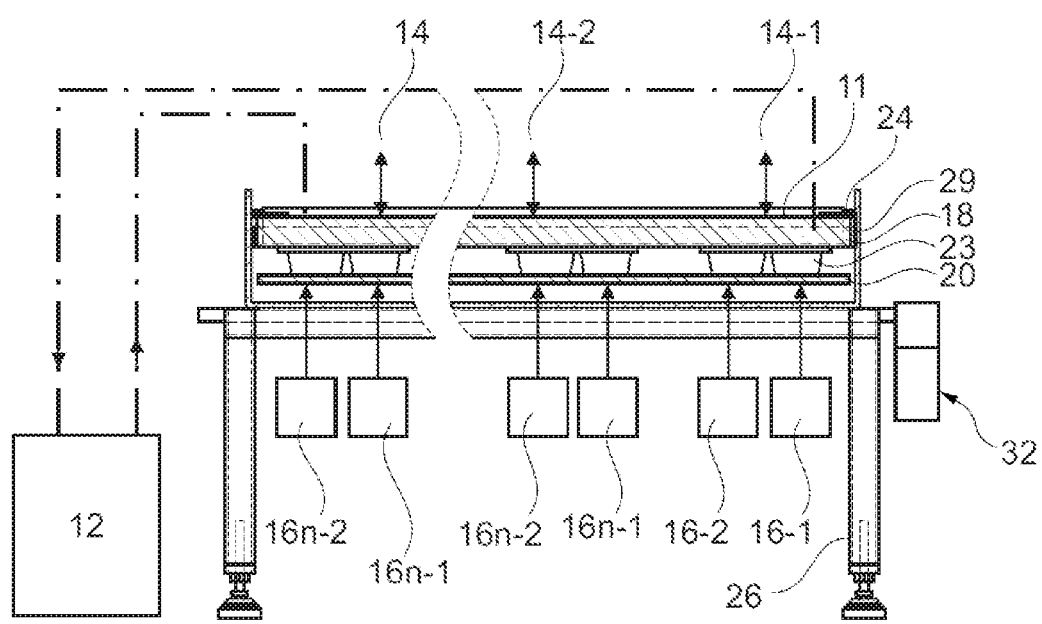

(51) Int. Cl.
      *A23L 3/04*           (2006.01)
      *H05B 6/68*          (2006.01)
      *H05B 6/78*          (2006.01)

(56) References Cited

U.S. PATENT DOCUMENTS

| | | | |
|---|---|---|---|
| 3,961,569 A * | 6/1976 | Kenyon | A23L 3/01 |
| | | | 99/451 |
| 4,261,504 A | 4/1981 | Cowan | |
| 5,066,503 A | 11/1991 | Ruozi | |
| 5,074,200 A | 12/1991 | Ruozi | |
| 2005/0123435 A1 | 6/2005 | Cutler et al. | |
| 2016/0183333 A1* | 6/2016 | Mohammed | A23L 3/045 |
| | | | 219/688 |

OTHER PUBLICATIONS

G.V. Barbosa-Canovas et al., "Advance retorting, Microwave Assisted Thermal Sterilization (MATS), and Pressure Assisted Thermal Sterilization (PATS) to Process Meat Products," *Meat Science*, vol. 98, No. 3, pp. 420-434, 2014.

* cited by examiner

PASTEURIZATION OF CONVENIENCE MEALS IN HERMETICALLY SEALED CONTAINERS

FIELD OF THE INVENTION

The invention relates to the preservation of food in general through heating by microwaves, wherein packages, e.g. prepared ready meals and dishes, are moved on endless chains or conveyor belts.

BACKGROUND OF THE INVENTION

Pasteurization is the heating of food and dishes to temperatures of at least 60° C. to a maximum of approx. 100° C. This disrupts the vegetative phases of the microorganisms and can be used to preserve food and dishes. The heating time is usually between 15 seconds and a few minutes in order not to compromise important properties such as consistency, taste or nutritional value. This kills most of the pathogenic bacteria and food spoilers.

Preservation is conventionally done with hot air, hot water or steam, so that the long heating times result in cooking and cooking effects. The long heating times change the taste of the food and often affect its packaging. On the other hand, if heating is shortened, it is difficult to achieve a homogeneous high temperature in the product. The results are unsatisfactory especially with solid and different foods, because in these the heat conduction is slower or different. Furthermore, pasteurization of closed packages requires a great technical effort.

For hygienic reasons, food must be packaged in retail outlets. In processed form, they can only be stored, transported and sold as packaged products. The conventional way of preserving food in packages is to arrange the food in packages (trays, containers or trays with cavities). These are sealed tightly and then the packages containing the food are heated so that all germs are killed off (see US 2005 0123435 A1).

In addition to the known processes for pasteurization or sterilization (from 121° C.), the heating by means of microwaves, usually with a frequency of 2.450 GHz or 915 MHz, is known in the state of the art. However, microwave heating is problematic for the carton pack because microwave preservation almost always starts with local steam formation before the rest of the contents of the carton pack are heated. The formation of steam and the heating of the water vapor cause an overpressure in a tightly closed package which can cause it to burst.

U.S. Pat. Nos. 3,889,009 A, 3,961,569 A and 5,066,503 A disclose processes for preserving food in packages. U.S. Pat. No. 5,074,200 A describe a continuous preservation by microwave heating, where the packages are moved on conveyor belts. The containers are elastic, and they are placed under increased ambient pressure during microwave heating so that they do not burst. The system required for this is complex, expensive and causes high operating costs.

U.S. Pat. No. 4,261,504 A reveals pressure-relieving packings from which water vapor generated during heating can escape. WO 2004/045985 A1 reveals a package with a flexible bottom and a cover foil in which a ventilation valve is located. The valve opens during heating if the overpressure in the container becomes too high. EP 2 400 862 B1 teaches a conservation procedure in transport and sales containers with ventilation openings. Preservation is carried out in a moist state by heating with microwaves. Subsequently, a cannula is used to inject a protective gas into the package and the puncture hole is closed. This procedure is comparatively complex.

Ready-made meals and dishes are usually prepared and packaged on trays, cassettes or trays with cavities, or in a carton. To prevent contamination and leakage of liquid, the packages must be tight during and after heating and until use. The containers are relatively thin-walled and usually made of plastic or lined laminate. Therefore, a counter pressure is required to the internal pressure if steam is generated during microwave heating. This internal pressure is typically in the range of 0.69-3.44 bar. The preservation is therefore conventionally carried out under increased pressure. Therefore, pasteurization or sterilization is usually done in batches in a retort. Batch operation in the retort is very time-consuming, because the overpressure cannot be quickly released. It would generally be desirable to be able to pasteurize or sterilize individual packs, especially for individual preparations. The state of the art thus represents a problem.

BRIEF DESCRIPTION OF THE INVENTION

This demand is satisfied by an equipment according to claim 1 and the associated procedure. Preferred forms of implementation can be found in sub-claims 2 to 10.

A device for the preservation of food and/or products by heating in hermetically sealed packages by means of microwaves is provided, comprising:
 a microwave chamber;
 a conveyor belt (32) for moving packages (22) of food through a microwave chamber (14)
 a microwave source (16) for heating the food and/or products in the packages, wherein
 the microwave chamber (14) is essentially at atmospheric ambient pressure,
 at least one cooling device (10) is provided, wherein the temperature of the cooling device (10) is predetermined by a cooling system (12), and the cooling device (10) is adapted to cool an elevated area of the hermetically sealed package;
 wherein the parts of the device are dimensioned and arranged such that the microwave source (16) heats the food and/or products in the packages (22) to preservation temperatures, and
 an overpressure in the packings (22) is dissolved by cooling and condensation of water vapor on an elevated surface of the packing (22), which is cooled by means of the cooling device (10).

The microwave energy is introduced at a frequency of 2.45 GHz or 915 MHz or a combination of both frequencies. The preferred cooling device is a cooling plate which has a temperature below the condensation point of water. The temperature will usually be in the range of 0 to 20 Gad Celsius, preferably 2 to 15 degrees Celsius, and especially preferred 4 to 10 degrees Celsius. Cooling can be applied to the top surfaces of the packs (22) via an endless belt or a chain belt. Cooling can be done with water or a coolant, as used in refrigeration units or freezers, or contactless via nozzles with cold gas or steam, particularly preferred, with critical or supercritical cold carbon dioxide.

Because of the cooling effect, the distance between the upper cooling system (18) and the lower conveyor belt therefore corresponds to the height of the packs (22) or the distances and heights are functionally matched to each other. The cooling system can be an upper endless belt (18) made of thermally conductive material.

Especially preferred is a functional design for packs or containers with several trays or cavities for different foods and dishes. The cavities are preferably heated individually by microwaves. The equipment may also have means for measuring the temperature of the contents of the package or the tray or cavity. It goes without saying that the temperature is preferably scanned without contact. For pasteurization, the package contents must be heated only briefly to a temperature of 60 to 85 degrees Celsius, which is only sufficient for pasteurization and not for sterilization, which requires temperatures above 121° C. The lidding film and the packaging are usually supplied to production in sterile, germ-free form and therefore no longer need to be specially sterilized.

Another aspect concerns processes for preserving food and dishes in hermetically sealed or closed packages (22), where the package has one or more cavities. These are sealed, individually or together, and the preservation is achieved by heating by means of microwaves, whereby during the supply of microwave energy the cover is cooled to below the condensation point of water vapor. This avoids a large overpressure in the hermetically sealed package. A particularly preferred design of the process comprises the following steps: providing a microwave chamber (14) at atmospheric pressure; providing a lower conveyor belt (20) for moving the packages through the microwave chamber; providing a topside cooling system (18), preferably comprising horizontally moved, vertically adjustable plates of heat conductive material; contacting the cooling with the hermetically sealed packages (22) during their movement through the microwave chamber (14); generating microwaves and heating the packaged food, wherein the cooling system (12) controls the temperature of the cooling or heating of the packaged food, respectively. the cooling plates (10) to below the condensation point of water vapor, contacting the surface of the packages (22); dissolving any excess pressure of resulting water vapor in the package (22) during microwave preservation or pasteurization by cooling the top of the package to below the condensation point of water vapor.

The equipment comprises a microwave chamber designed to prevent microwave energy from escaping into the environment. This can be achieved by a rotating microwave trap. The conveyor belt for the containers or packages runs essentially horizontally and can be made of a material that is permeable to microwaves. The upper cooling system, preferably an endless belt or link belt, runs essentially horizontally and is vertically adjustable. Endless conveyors are preferably provided to move the closed packages of food through the microwave chamber and an upper endless cooling system, preferably in the form of an endless belt or chain of links, to cool the top surfaces of the packages. The microwave source can be located below the lower endless belt. The device is characterized by the fact that the microwave chamber is under atmospheric pressure and that the device comprises cooling media which heat-conductively pressurize the packs from above. The temperature of the coolant or plates is preferably set and controlled by an (external) cooling unit. The upper coolant or the endless coolant belt can be made of a heat-conducting material, whereby nozzles for coolant are also considered. The equipment is designed and set up in such a way that the microwave energy of the microwave source heats the goods in the packages to pasteurization temperatures. A temporary overpressure in the package, e.g., due to locally generated water vapor, is dissolved by cooling the top surface of the packages. The top surface can be, for example, the lid, the cover foil or a cover hood. This can be achieved by heat-conducting contact with the coolants acting from above or the coolant band. This prevents the packages from bursting or bursting due to excess pressure.

The device thus allows the use of commercially available plastic and foam containers which can be loaded with a variety of moist, pasty or solid convenience foods. The heat generated by microwaves can still create a certain overpressure in the hermetically sealed package. However, only the transition of water into the vapor or gas phase can really build up pressure and endanger the integrity of the package, which is avoided by cooling. Nevertheless, pasteurization and preservation of the food in the hermetically sealed package can be achieved.

The packages (containers, trays, trays or similar) can, for example, be sealed with a cover film (shrink film). Although these packs are inexpensive, weight-saving and meet the requirements of food safety, they do not meet the structural requirements for holding an overpressure. The cover films often cannot resist even a slight overpressure. Aluminum foils, rigid plastic lids and thermally strong foils with overlapping folds and sealing edges are generally preferred.

The equipment described is advantageous because it allows the use of standard containers for ready meals. The equipment reduces the size and complexity of the pasteurization system compared to the state of the art in U.S. Pat. No. 3,961,569, because it can operate under ambient pressure. No means of generating and maintaining overpressure are necessary. It can therefore be operated continuously, as opposed to heating batches in sealed containers. The dissolution of the internal pressure takes place at the same time as the heating by microwave. Therefore, no further chambers or equipment sections are required.

Another advantage is the prevention of contamination after pasteurization due to invisible leaks. The leakage of liquids and the prevention of contamination of the equipment are also prevented. In addition, the aromas remain in the package, which improves the taste properties of the ready meals and products. This is a particular advantage over solutions with valves and vents (see EP 2 400 862 B1). Such solutions force the ready meal producers to use special containers, which are correspondingly expensive. Especially in the food sector, margins are low, and any cost saving is an advantage.

In one version, the microwave source is operated at a frequency of 2.45 GHz or 915 MHz. A combination of both frequencies can also be used. Another preferred design concerns the cooling of the cold plate to a temperature below the condensation point, preferably to 2 to 20° C., especially preferred 3 to 15° C., extremely preferred 4 to 10° C.

Another design concerns the distance between the upper cooling belt and the lower conveyor belt. This corresponds essentially to the height of the packages. The distance must functionally correspond to the packs so that their lids or covers are cooled. The upper belt is therefore adjustable in height. It can be made of thermally conductive material (metal, metallic alloy, silicone, polysiloxane, glass fiber, polyolefins (polypropylene, polyethylene, polytetrafluoroethylene, etc.), a metal alloy or a combination with other materials (composite material). The power of the microwave source can range from 1 kW to 6 kW, preferably from 2 kW to 6 kW. Usually MW sources with a power of 3 kW to 6 kW using magnetron technology are used.

Especially preferred is the generation of microwaves by a semiconductor controlled oscillating circuit. Semiconductor-based microwave generation allows the frequency and output power to be adjusted and by varying the frequency, different types of food can be heated individually on a tray or menu dish. Thus, homogeneous temperatures can be achieved on the menu trays, even if the food has been prepared at different temperatures. For example, chicken meat is often served chilled at about 15° C. in the menu tray and rice is served warm at 45° C. With the help of a semiconductor-based microwave heating system, these temperatures can be adjusted to each other by adjusting the microwave power in a continuous flow, so that a homogeneous pasteurization is achieved.

Another aspect concerns packages for use with the device according to the invention, which consists of a container with one or more cavities in which the food or dishes are arranged and a cover (cover hood, cover film, cover plate) that is sealed to the container. The connection can be made by folding, gluing or other sealing means. Several cavities can then be treated individually—depending on the type of food—with microwave energy.

The equipment may comprise means for measuring the temperature, e.g. IR pyrometers, to check the heating in the package. In one version, the food in the package is heated to a temperature of 60 to 99° C., preferably 65 to 90° C., further preferably 70 to 85° C.

Another aspect concerns processes for preserving food by microwave in hermetically sealed packages, comprising the following steps providing a microwave chamber (with ambient pressure); providing an endless conveyor belt made of microwave permeable material; providing an upper endless cooling belt, running horizontally, made of heat-conducting material; providing a cooling device made of a material impermeable to microwaves, which is in close contact with the package, wherein the cooling device can serve as a ceiling of the microwave chamber and is vertically adjustable as required; moving hermetically sealed packages of encapsulated food through the microwave chamber; generating microwaves and heating the encapsulated food; providing a cooling system that controls the temperature of the cooling device; contacting the cooling device with the top surface of the package or The cooling device is in contact with the top surface of the package or the lid; dissolving any excess pressure in the package, whereby any water vapor produced condenses, thus preventing the package from bursting or opening during or after pasteurization. In the case of an endless cooling belt or link chain, microwave traps are provided, in particular, to prevent microwave leakage radiation and to comply with the legal limits for leakage radiation.

Further designs and advantages are now described based on the examples and drawings. These concern preferred embodiments of the inventions and are intended to represent, but not to limit, the inventive idea. The entirety of the disclosure results from the description and the claims.

SHORT DESCRIPTION OF THE IMAGES

Figure 2:
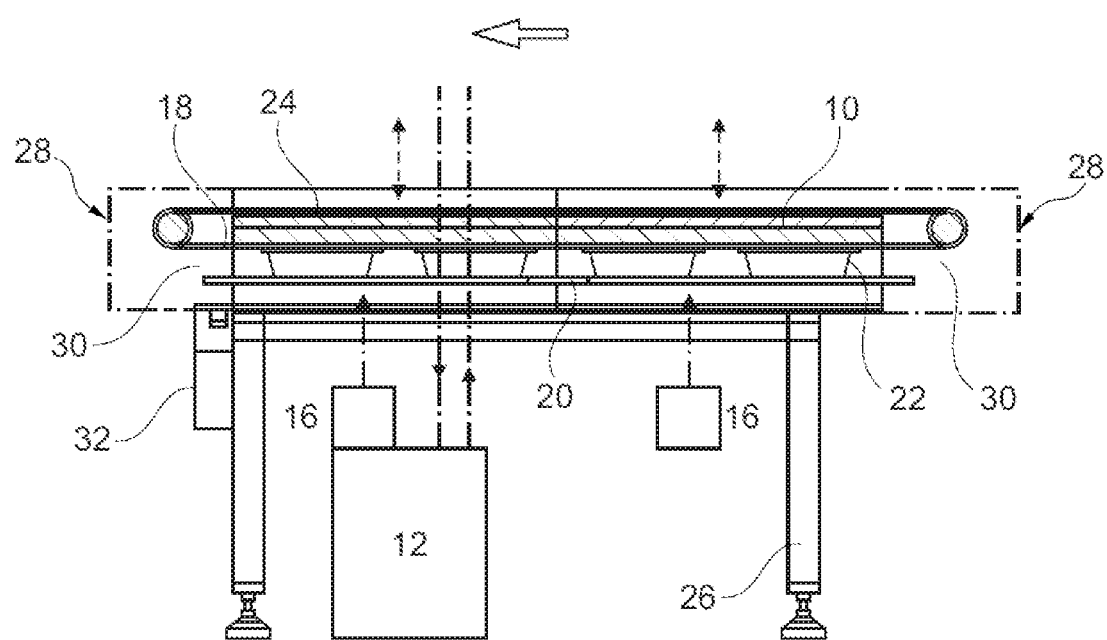
Figure 3A:
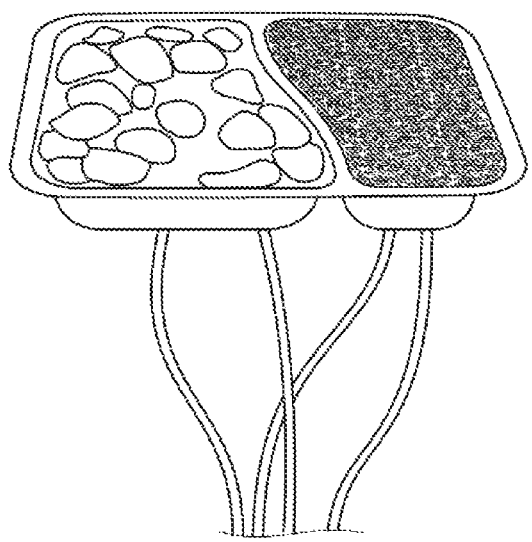
Figure 4A:
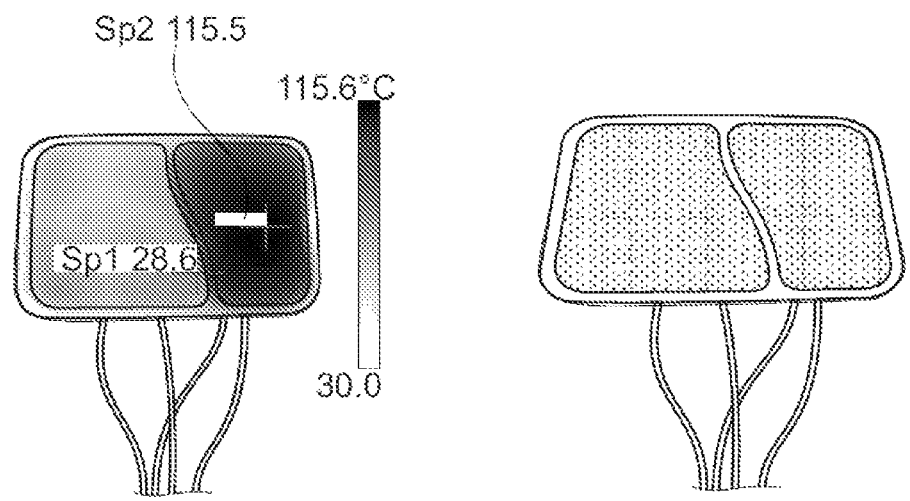
Figure 4B:
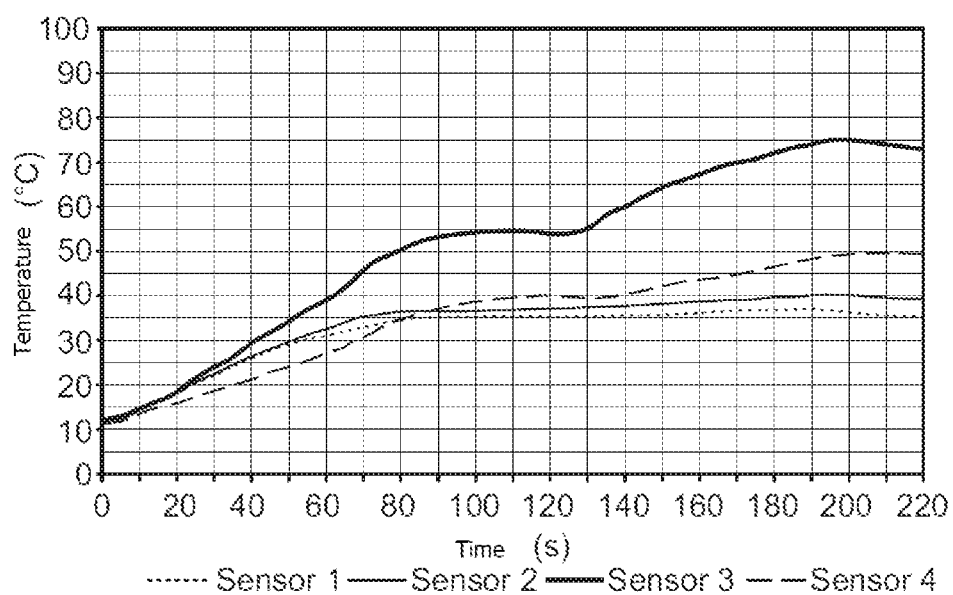
Figure 5A:
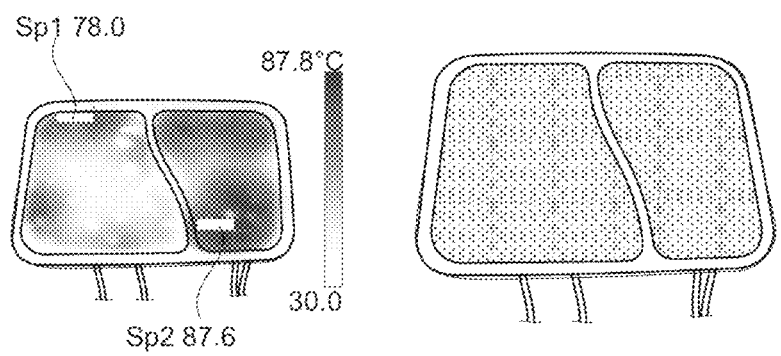
Figure 5B:
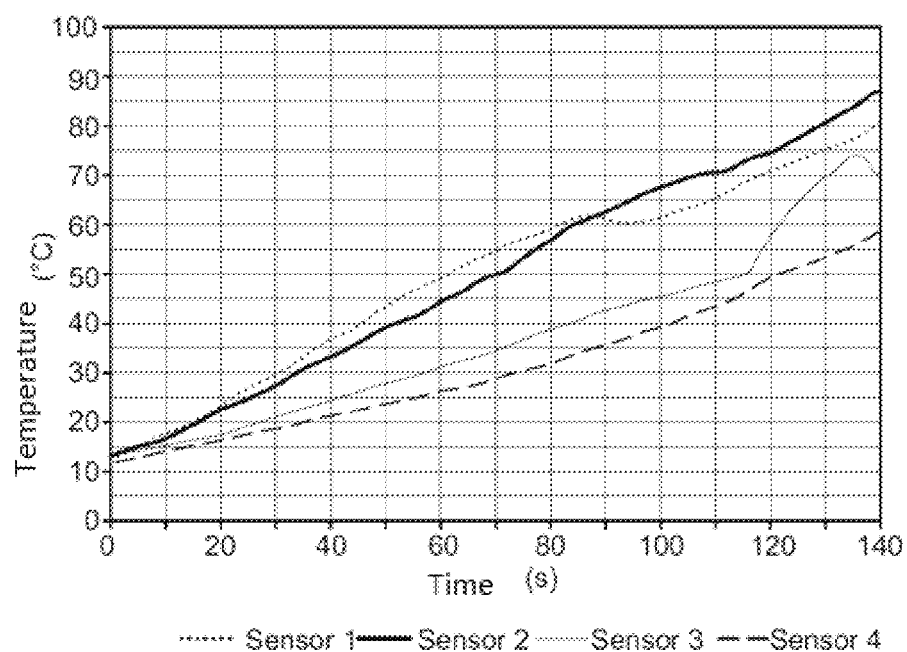
Figure 6A:
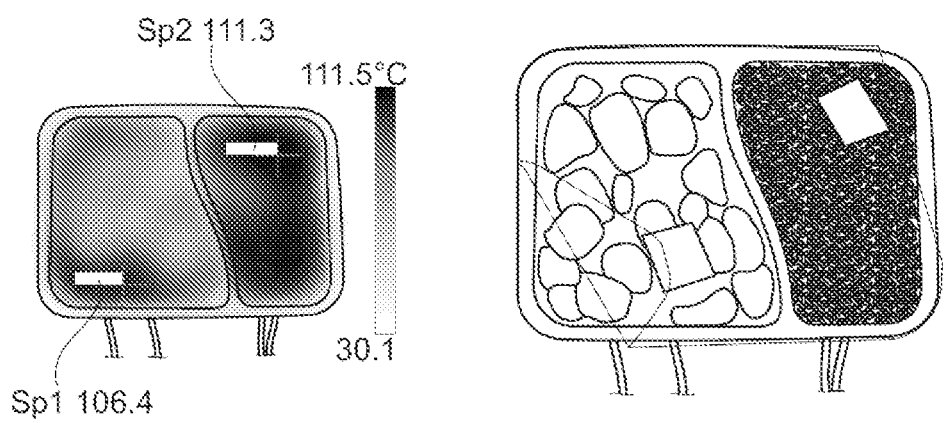
Figure 6B:
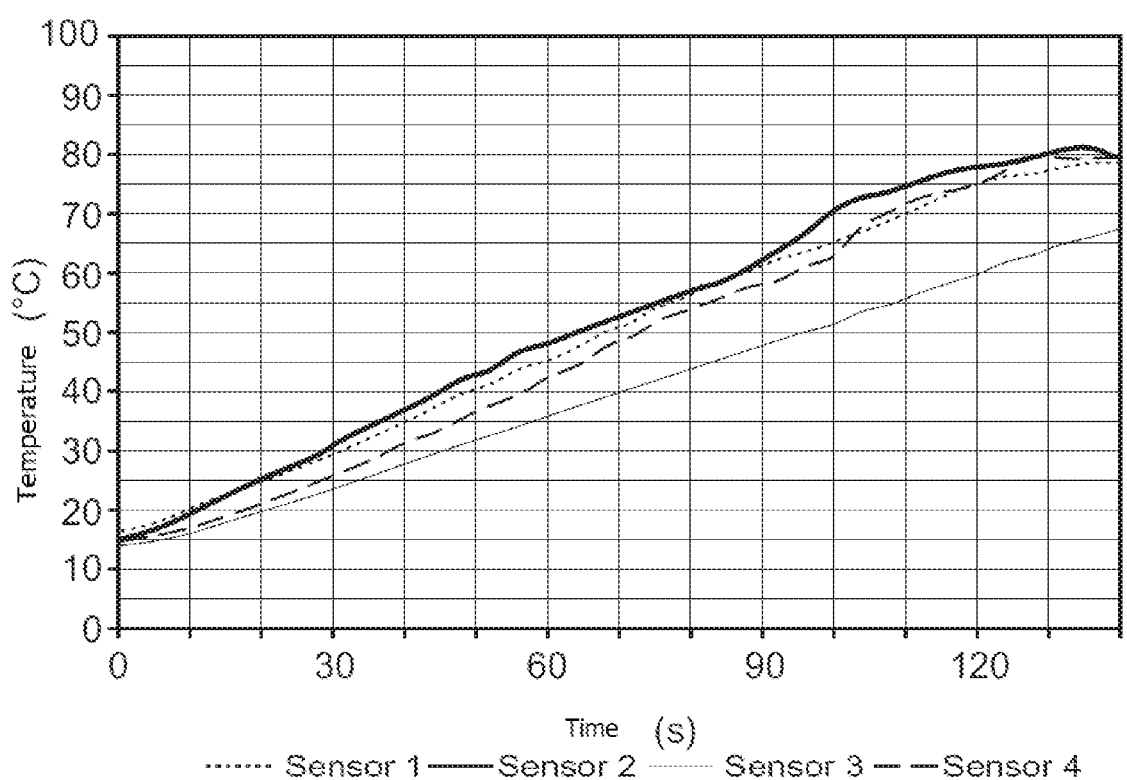
Figure 7:
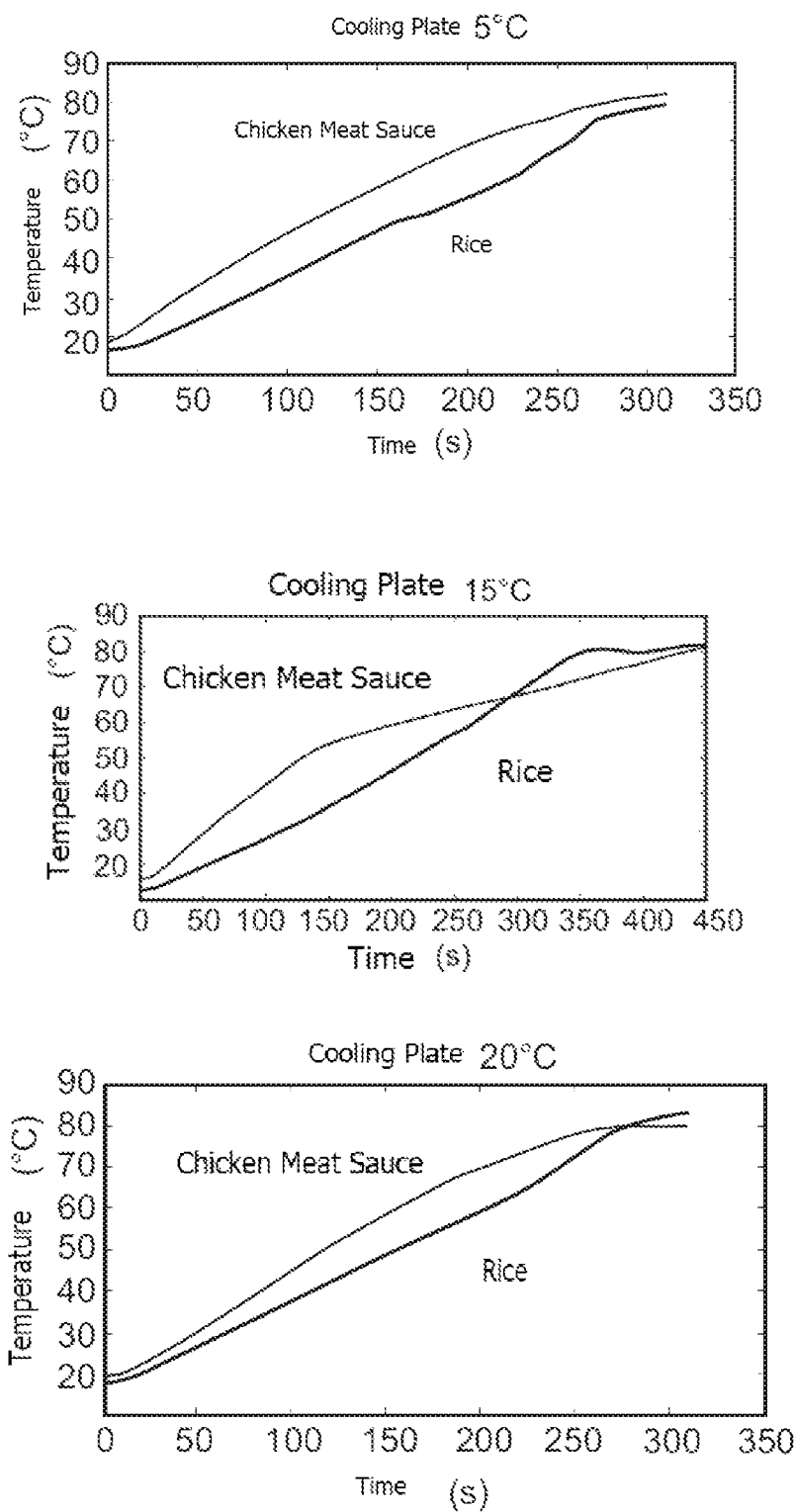

It shows:
FIG. 1 a drawing of the device according to the invention for preserving/pasteurizing packaged food by microwave;
FIG. 2 a drawing of the side view of the setup of FIG. 1;
FIG. 3a a photograph of a 2-cavity foil package (rice with chicken meat in sauce) on the conveyor belt of a microwave tunnel (pilot plant)
FIG. 3b Pictures of the cooling of the lid film of the 2-cavity pack of FIG. 3a and of the placement of the temperature sensors (S1-S4);
FIG. 4a a thermal image and an image of the package of FIG. 3a after heating by microwave to the planned 85° C.;
FIG. 4b a diagram of the temperatures measured by the sensors at different locations and in different foods in degrees Celsius (ordinate) over the microwave time in seconds (abscissa) in the experiment in FIG. 4a;
FIG. 5a a thermal image and an image of the intact package as shown in FIG. 4a after heating by microwave to the planned 85° C. with a ceiling cooling of 5° C.;
FIG. 5b a diagram of the temperature curve and the temperature distribution in the various foods in the experiment in FIG. 5a;
FIG. 6a a thermal image and an image of the (burst) pack of FIG. 3a after heating by microwave (6000 W, 2.45 GHz) to a planned 85° C. with ceiling cooling at 20 degrees Celsius;
FIG. 6b a diagram of the temperature curve and the temperature distribution in the various foods in the experiment in FIG. 6a;
FIG. 7 Diagrams of the temperature curve and temperature distribution in the different foods with optimized microwave heating and different cooling of the ceiling foil with 5, 15 and 20 degrees Celsius;

DETAILED DESCRIPTION OF THE INVENTION

The equipment and the pasteurization process are described in detail using foil-sealed packages with two cavities and different foods. The food is advantageously hermetically sealed in the package, which is naturally permeable to microwaves, but has no ventilation holes or valves. This allows the use of containers typically used in retail for handling and storing ready-to-eat meals. The process can be adapted to all common containers and packages because pasteurization with microwaves puts less stress on the package or container as a whole than if heat and pressure are applied from outside. The organoleptic characteristics and appearance are also less affected than, for example, when heated in a retort. Finally, labor costs can be reduced due to the continuous treatment and the possibility of automation.

Microwave treatment involves the generation of heat by exploiting the dipole properties of water molecules. There is still the difficulty to achieve a homogeneous heating in different foods. Only then can pasteurization be achieved in less time than heating by thermal conduction.

FIG. 1 shows an example of a device for pasteurizing food in hermetically sealed packages 22 or containers, which must be naturally permeable to microwaves. The pasteurization plant comprises a tunnel-like housing which serves as microwave chamber 14 and in which atmospheric ambient pressure prevails. The microwave chamber 14 extends horizontally and is designed in such a way that no microwave energy is released into the environment. The device comprises a lower endless conveyor belt 20, made of a material that is permeable to microwaves (polypropylene, glass fiber, silicone, polysiloxane, polyolefin, polytetrafluoroethylene). The upper belt or link chain 18 is endless, also running essentially horizontally, and it is vertically adjustable. The shown packing 22 (FIG. 3a) has two separate cavities. There may also be more or less cavities.

In addition to the propulsion means 32 for moving the packs 22 through the microwave chamber 14, microwave sources 16 under the conveyor belt 20 are shown in FIG. 1. The circulating upper "cooling belt" 18 runs through a sealing/sealing lip 24 to wipe off contamination. This can also serve as microwave trap 29 or cooperate with it. The assembly is held by a frame 26. A modular design is also being considered, i.e. independent microwave chambers 14, so that the system is scalable and guarantees reproducibility across the transport direction. This reduces the effort for a uniform temperature development on different menu trays. The temperature development is less of a problem in throughput direction because the meal trays pass through field maxima and minima in relation to the microwaves, while the microwave field is considered to be standing in the cross direction. If one wants to increase the throughput, microwave chambers 14 can be arranged both in width (transverse to the belt direction) and in length (in belt direction). The adjacent microwave chambers 14 can be separated from each other by separating plates.

If the tight packages 22 with the food to be pasteurized pass through the microwave chamber 14, they are heated by the microwave source 16 under the conveyor belt 20 to a temperature that kills the microorganisms. The microwave treatment takes only a few seconds to reach the intended temperature. Not shown, but further provided are also means and sensors to determine the temperature inside the packages 22. Based on these measurements, the applied power of the microwave treatment and the duration can be calculated and controlled.

FIG. 2 shows the arrangement of FIG. 1 with packs 22 in the direction of flow (arrow) between the conveyor and cooling belt. One gate area each, i.e. one inlet and one outlet 30 at the opposite ends, is provided for inserting and removing the packs 22. The system comprises microwave absorbers 28 or traps at the ends of the device, so that the environment is protected from radiant energy.

Endless conveyor and cooling belts 18, 20 are provided for conveying the packages 22 in the design shown. These can also be link chains or movable moving tables or plates. They are made of heat-conducting or microwave-permeable materials, depending on the application. The upper belt 18 is positioned to the lower conveyor belt 20 in such a way that the distance cooperates with the ceiling height of the packs 22.

Packs 22 with food in different cavities can also be sent through the microwave chamber 14. The container itself is usually completely transparent to the microwaves. Only the contents or the water-containing food is heated. The chamber 14 can contain microwaves from one or more sources 16. These may have one or different frequencies. Different frequencies can be advantageous for a differentiated heating of different foods in several room areas. The coupling or introduction of the microwaves can be done directly or via waveguides through the bottom of the microwave chamber 14. The temperature in the packs 22 can be measured contact-free by means of IR-pyrometer (see FIG. 4a, 5a, 6a). It is also possible to measure the temperature at the bottom of the package 22.

Figure 3B:
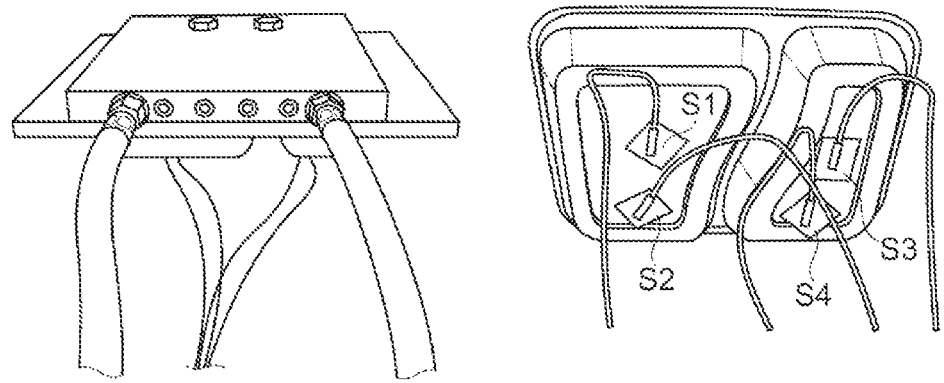

The device shown in FIG. 3b works with a cooling plate 10, which can be made of steel or aluminium, i.e. of a material that is not permeable to microwaves, and which is moved in the finished device together with the conveyor belt (not shown in FIG. 3b). The cooling plate can be in thermal contact with an endless cooling belt 18 (see FIG. 2), so that the packs are cooled from above as they pass through the microwave chamber. The cooling plate(s) 10 can also be used as the top of the microwave chamber 14. They are preferably connected to a cooling system 12 or a cooling unit. The upper conveyor belt 18 is made of a material with good thermal conductivity and is preferably flexible to achieve a close contact with the package cover. It is preferably soft to prevent damage to the cover films or hoods and to compensate for any unevenness. The upper cooling belt 18 should not be harder than packs 22. The cooling 10 can preferably be designed as a metallic hose or as a link chain and can be attached to an endless cooling and running belt 18. The walls of the cooling plate 10 or cooling chain are preferably made of metal, because metals are usually good heat conductors and not permeable to microwaves. If water is used for cooling, it must be shielded against microwaves. During the microwave energy supply the conveyor belt 18 can be in motion or can be clocked. The temperature of the cooling plate is preferably controlled by a separate cooling system 12 (cooling unit), e.g., by means of a re-cooler, condenser, or cooling unit, which supplies coolant to the cooling plate in a circular flow. The cooling plate 10 is preferably cooled to a temperature of 2 to 10 degrees Celsius. Precise positioning of the upper belt 18 is necessary to avoid crushing of packs 22. Microwave heating can be constant or pulsed as required.

If water vapor is generated in pack 22 during microwave treatment, it will be deposited on the cold ceiling wall (cover, hood, film, cardboard wall). This results in less overpressure inside and the cover foil softens less. Cooling takes place only on the ceiling of pack 22 or on the cover film or hood, but not on the food to be pasteurized. Pasteurization of the food is nevertheless achieved. This reliably prevents the cover film from bursting or opening during microwave heating. A particular advantage of the process described above is that no volatile substances and aromas can escape from Pack 22. This is particularly desirable in Asian cuisine and is a critical quality feature.

The pasteurization of the products on the menu trays 23 is achieved by heating them to 60 to 100 degrees Celsius. If the menu trays have several individual cavities, these can be treated specifically with different microwave outputs. The expert knows how to achieve different microwave outputs in the room (focusing, phase interference, frequency shift). He can adapt the power of the microwave sources to the respective cavities and dishes. This will have to be adjusted regularly. Ultimately, the aim is to produce only the required pasteurization temperature in the cavities of the menu tray 23.

The speed of the conveyor belts 18, 20 and the microwave pulses are adjusted so that the packs 22 do not burst or open. This can only be achieved with simultaneous cooling. At the exit of the microwave chamber 14 the food is still pasteurized because of its temperature. There is no need to depressurize and cool the packs 22, because unlike in the state of the art, the trays were not heated under external pressure.

The device in accordance with the present invention allows a simple arrangement and the simultaneous use of microwave energy and cooling in one operation. The containers, covers and menu trays 23 can be made of laminated cardboard or polyethylene terephthalate (PET), for example, which can permanently withstand temperatures of 120° C. Polypropylene (PP) can withstand temperatures of up to 100° C., is food safe and therefore also a suitable packaging material. Polycarbonate (PC) is also used as microwave dishes due to its high heat resistance.

EXAMPLE

Execution Example

A pilot plant of the facility (see FIGS. 1, 2 3a, b) was used for pasteurization of dense two-chamber meal trays (PET hard trays). The pilot plant was designed for a microwave tunnel for pasteurization of 6000 menu packs per hour. The menu was chicken in sauce at 15 to 20° C. and rice at 45 to 50° C. The cavities contained separate rice and sauce with chicken. A subtask was therefore to adjust the temperatures of the two foods by targeted heating with microwave. The semiconductor-based microwave technology facilitates this if the microwave power can be set up in the room by frequency and phase shifting. The food was heated up to 80 to 85° C. in the package while simultaneously cooling the ceiling surface with a cooling plate at 5° C., 15° C. and 20° C. The results are shown in FIG. 7 (temperature (° C.)/time (seconds). The temperature of the food was determined with sensors and with IR-pyrometer. The microwave power could be dosed and applied in a controlled manner. A homogeneous pasteurization of the two different foods in one package could be achieved and the containers remained tight in all cases. The equipment thus allowed a pasteurization of dishes in a short time. Pasteurization was fast and offered cost advantages due to energy efficiency. The pasteurized food was also organoleptically perfect after pasteurization.

Execution Example 2

The experiments of example 1 were repeated, but menu trays with foil covers (see FIG. 3a) were used. The two dishes were each heated on the conveyor belt to pasteurization temperature (85 degrees Celsius), or heating was stopped if the packages burst (experiments no. 1 and 3). The sealed cover foil was cooled over a plate as shown in FIG. 3b, on the left, and the floor temperature was measured by four sensors (S1-S4). See Table 1.

TABLE 1

| Sample No. | MW - Capacity (W) | Time in sec. | Start Temp. (° C.) | End temp. (° C.) | Cooling |
|---|---|---|---|---|---|
| 1 | 6000 | 220 | 10 | 75 | Without cooling |
| 2 | 6000 | 140 | 12 | 87 | Cold plate with 5° C. |
| 3 | 6000 | 135 | 14 | 81 | Cold plate with 20° C. |

In experiment no. 2, a uniform temperature distribution was achieved on the meal tray until pasteurization. No cracking or chipping of the package was observed, although the food was heated up to 85+° C. Only effective cooling of the thin film was required. Thus, ready meals in commercial packaging could be pasteurized in a continuous operable unit.

For effective cooling of the cover film, it may be sufficient to apply cold gas, cold mist, or cold particles to the film through directed nozzles. It will be particularly preferred to cool the film essentially contact-free with carbon dioxide particles, so-called CO2 snow jet. Compressed (liquid or supercritical) carbon dioxide is particularly suitable for cooling complex surfaces due to its low viscosity, low interfacial tension and high heat of evaporation. In large-scale industrial applications, supercritical CO2 has been used for years in the extraction of natural substances, for example in the decaffeination of coffee and the cleaning of car body and paint parts. Since the medium carbon dioxide changes directly to a gaseous state under ambient conditions, it leaves no residues, unlike conventional coolants. There is no need for complex and cost-intensive drying. It is also considered to be environmentally neutral, as it is a waste product from many chemical processes, such as ammonia synthesis. Therefore, the gases can simply be extracted, making the gas a cost-effective option for contact-free cooling.

Synopsis

Pasteurization in packages by microwave heating could not be carried out continuously on an industrial scale up to now, unless equipment was used to put the packages under external pressure. In this case, however, a careful pressure reduction was required in a separate step to avoid splashing of liquid components. The heat transfer was also prevented by the wrapping or packing. Without external pressure, pasteurization could not take place with microwave ovens, because heating by means of microwave ovens created an uncontrollable internal pressure in the package, in the packing, which caused the fragile packs to burst.

Another problem was a microwave treatment unit that could be used to pasteurize packs in cycles or continuously. Without exception, the different contents of a package must be brought to temperature. There was also the constant challenge of obtaining better tasting products with more aroma, as the pasteurization of packages with valves or vents would cause adverse aromas and taste to escape. Furthermore, the equipment had to be simple and not require pressure devices or vacuum. And the process should be suitable for standard packages, trays or trays with cavities and a cover (hood, film). In a vacuum, however, the cover film would adhere to the food and sauces and the liquids would take their own lanes. These problems could be solved, as the example shows.

LIST OF REFERENCE CHARACTERS

10 Cooling element
11 Vertically moveable cooling element, usable as chamber ceiling
12 Cooling system
14 Microwave chamber, -tunnel
16 Microwave sources (16-1, 16-2)
18 Upper treadmill (cooled)
20 Lower conveyor belt
22 Package with food
23 Menu tray with one or more cavities
24 Seal, sealing lip
26 Rack
28 Microwave absorber
29 Microwave trap
30 Opening
32 Tunnelling equipment

The invention claimed is:

1. A device for pasteurizing food by microwave in hermetically sealed packets, comprising:
   a conveyor belt and means for moving the hermetically sealed packets of food through a microwave chamber,
   a microwave source which heats the food with microwaves to pasteurization temperatures as it passes through the microwave chamber, wherein:
   atmospheric ambient pressure prevails in the microwave chamber,
   at least one solid cooling element is provided in the microwave chamber, which cooling element is arranged thermally conductive on at least one contact surface of the packet, so that the packets are cooled by contact through at least one surface when passing the microwave chamber in such a way that, during microwave heating, any excess pressure due to water vapor inside the hermetically sealed pack is reduced by cooling and condensation on the cooled surface, and
   wherein the microwave source is adapted for heating the food in the hermetically sealed packets to a temperature of 65 to 90 degrees Celsius, and the cooling element simultaneously cools a surface of the packets to a temperature below 20 degrees Celsius.

2. The device according to claim 1, wherein the microwave source operates at a frequency of 2.45 GHz or 915 MHz or a combination of both frequencies.

3. The device according to claim 2, wherein the microwave source comprises a semiconductor-based resonant circuit so that frequency, phase and power are variable.

4. The device according to claim 1, where the cooling element is designed to have a temperature below the condensation point of water in the range from 0 to 20 degrees Celsius.

5. The device according to claim 1, wherein the cooling element has nozzles from which cold gas or liquid or supercritical carbon dioxide emerges for contact-free cooling of a surface on the packing.

6. The device according to claim 1, wherein, at a distance from the endless conveyor belt, an upper cooled endless belt is provided which runs in the same direction and speed and which is cooled, wherein the distance between the two endless belts corresponds substantially to the height of the packets on the conveyor belt.

7. The device according to claim 6, wherein the upper cooled endless belt and cooling element can be moved vertically.

8. The device according to claim 1, further comprising means for measuring the temperature of the contents of the package.

9. The device according to claim 1, where the cooling element is designed to have a temperature below the condensation point of water in the range from 2 to 15 degrees Celsius.

10. The device according to claim 1, where the cooling element is designed to have a temperature below the condensation point of water in the range from 4 to 10 degrees Celsius.

\* \* \* \* \*